United States Patent
Gecer Ulu et al.

(10) Patent No.: US 11,461,511 B2
(45) Date of Patent: Oct. 4, 2022

(54) SPATIAL FIELD OPTIMIZATION WITH REDUCED PARAMETERS

(71) Applicant: Palo Alto Research Center Incorporated, Palo Alto, CA (US)

(72) Inventors: Nurcan Gecer Ulu, Sunnyvale, CA (US); Svyatoslav Korneev, Stanford, CA (US); Saigopal Nelaturi, Mountain View, CA (US); Erva Ulu, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 223 days.

(21) Appl. No.: 16/818,379

(22) Filed: Mar. 13, 2020

(65) Prior Publication Data

US 2021/0286910 A1 Sep. 16, 2021

(51) Int. Cl.
*G06F 30/12* (2020.01)
*G06F 111/04* (2020.01)
*G06F 111/02* (2020.01)
*G06F 111/10* (2020.01)

(52) U.S. Cl.
CPC .......... *G06F 30/12* (2020.01); *G06F 2111/02* (2020.01); *G06F 2111/04* (2020.01); *G06F 2111/10* (2020.01)

(58) Field of Classification Search
CPC ..... G01R 33/385; H01F 41/04; H04B 7/0639; H04N 5/23206; G06F 2111/04; G06F 30/12; G06F 2111/10
See application file for complete search history.

(56) References Cited

U.S. PATENT DOCUMENTS

| | | | |
|---|---|---|---|
| 6,744,821 B1* | 6/2004 | Van Acker | H04L 27/265 375/260 |
| 7,116,723 B2* | 10/2006 | Kim | H04B 7/0634 375/267 |
| 7,791,587 B2* | 9/2010 | Kosugi | H04N 5/23206 345/156 |
| 9,842,689 B2* | 12/2017 | Bindseil | H01F 41/04 |
| 2002/0018530 A1* | 2/2002 | Kim | H04B 7/0639 375/267 |
| 2007/0270983 A1* | 11/2007 | Yasui | F02D 35/023 700/31 |
| 2011/0251832 A1* | 10/2011 | Schoeberl | G06F 30/23 703/2 |
| 2015/0262329 A1* | 9/2015 | Vink | G06T 3/40 435/6.11 |

(Continued)

OTHER PUBLICATIONS

Ulu et al., "Structural Design Using Laplacian Shells", Eurographics Symposium on Geometry Processing, vol. 38, No. 5, 2019, 14 pages.

(Continued)

*Primary Examiner* — Thai Q Phan
(74) *Attorney, Agent, or Firm* — Mueting Raasch Group

(57) ABSTRACT

A method for producing a design includes receiving a set of design constraints. A spatial field is created based on the design constraints. The spatial field is represented with a linear combination of one or more bases. A number of the one or more bases is less than a number of elements in the spatial field. Respective weights are optimized for each of the one or more bases. A design is produced based on the spatial field and the weights.

16 Claims, 12 Drawing Sheets

(56) References Cited

U.S. PATENT DOCUMENTS

2016/0178718 A1\* 6/2016 Bindseil ............... G01R 33/385
 324/322
2018/0102215 A1\* 4/2018 Bindseil ................. H01F 41/04
2020/0243275 A1\* 7/2020 Henke .................... H01H 1/605

OTHER PUBLICATIONS

Ulu et al., "Lightweight Structure Design Under Force Location Uncertainty" ARXIV.org, Oct. 26, 2018, 13 pages.
Ulu, "Enhancing the Structural Performance of Additively Manufactured Objects", ARXIV.org, Nov. 1, 2018, 104 pages.
European Search Report from EP Application No. 21159107.8 dated Aug. 5, 2021, 11 pages.

\* cited by examiner

Inputs

Compute Basis Functions

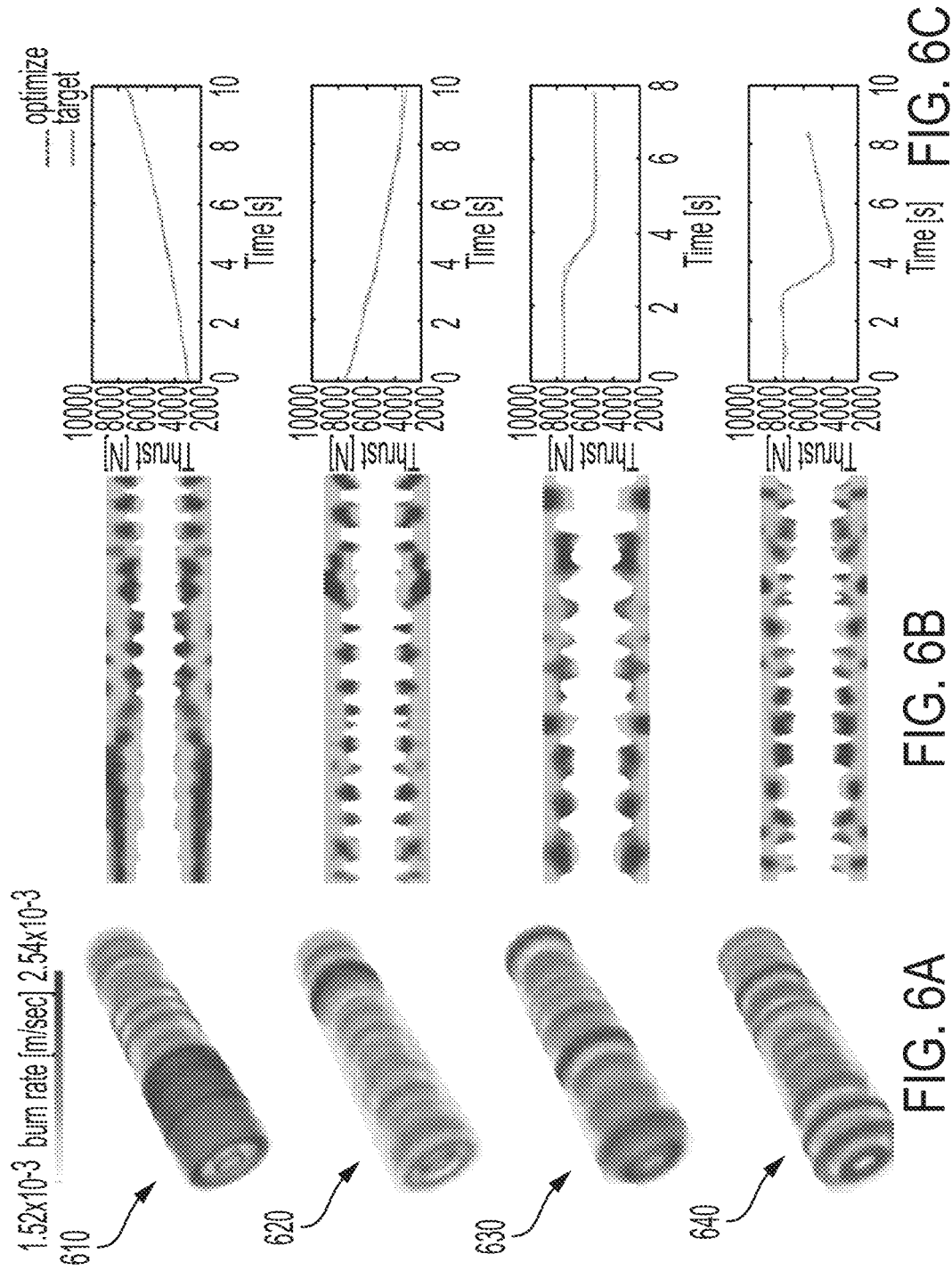

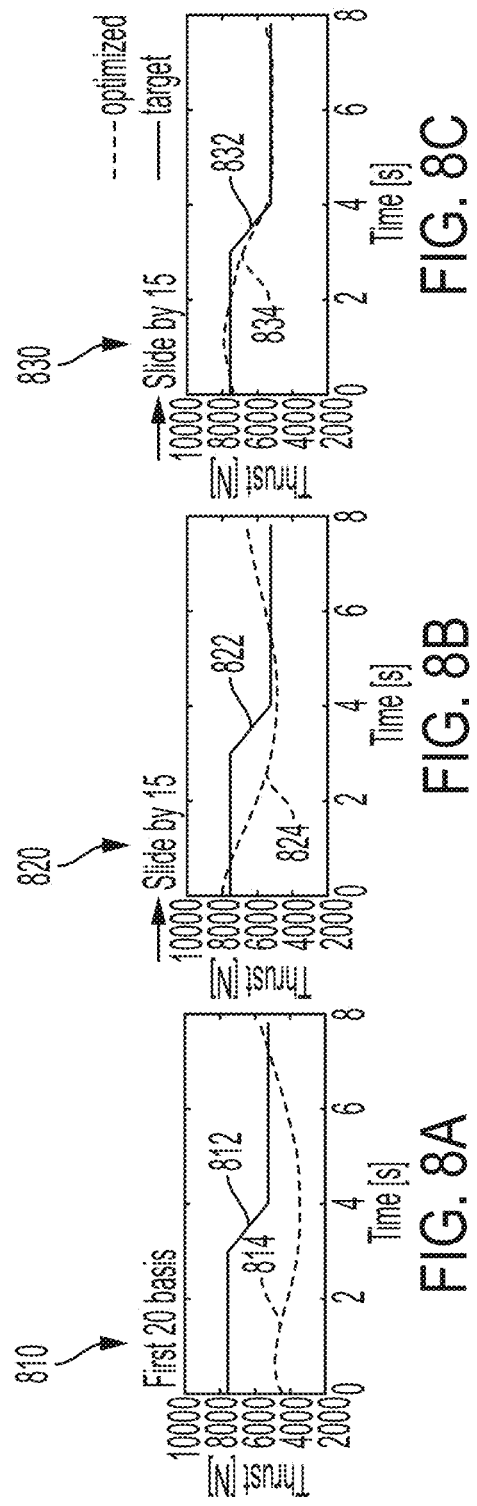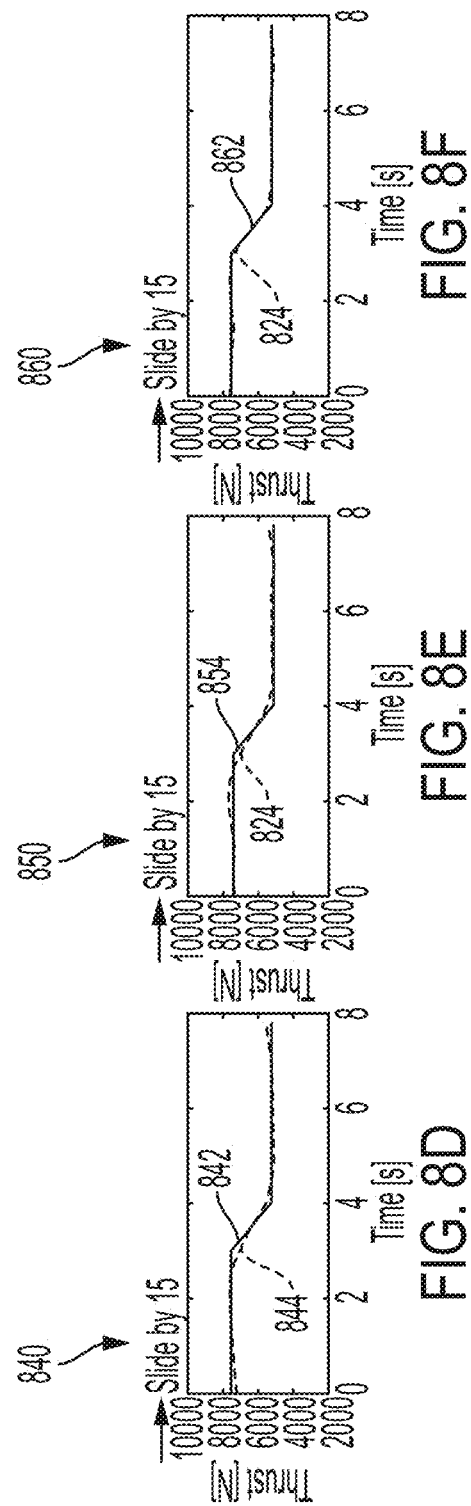

SPATIAL FIELD OPTIMIZATION WITH REDUCED PARAMETERS

STATEMENT REGARDING FEDERALLY SPONSORED RESEARCH AND DEVELOPMENT

This invention is made with Government support under DARPA contract HR0011-17-2-0030 FIELDS: Fabricating with Interoperable Engineering, Planning, Design and Analysis. The Government has certain rights to this invention.

TECHNICAL FIELD

The present disclosure is directed to the design of material distribution.

BACKGROUND

Multi-material additive manufacturing (AM) has shown great potential with superior product performance compared to homogeneous designs allowing both graded distributions (i.e., mixture of base materials) and combination of discrete material sets.

SUMMARY

Embodiments described herein involve a method for producing a design, comprising receiving a set of design constraints. A spatial field is created based on the design constraints. The spatial field is represented with a linear combination of one or more bases. A number of the one or more bases is less than a number of elements in the spatial field. Respective weights are optimized for each of the one or more bases. A design is produced based on the spatial field and the weights.

A system for producing a design includes a processor and a memory storing computer program instructions which when executed by the processor cause the processor to perform operations. The operations comprise receiving a set of design constraints. A spatial field is created based on the design constraints. The spatial field is represented with a linear combination of one or more bases. A number of the one or more bases is less than a number of elements in the spatial field. Respective weights are optimized for each of the one or more bases. A design is produced based on the spatial field and the weights.

Embodiments involve a non-transitory computer readable medium storing computer program instructions, the computer program instructions when executed by a processor cause the processor to perform operations. The operations comprise receiving a set of design constraints. A spatial field is created based on the design constraints. The spatial field is represented with a linear combination of one or more bases. A number of the one or more bases is less than a number of elements in the spatial field. Respective weights are optimized for each of the one or more bases. A design is produced based on the spatial field and the weights.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIGS. 6A-6C illustrates the sliding basis optimization results for four different thrust profiles in accordance with embodiments described herein;

FIGS. 8A-8F show the target and optimized thrust profile results during six steps of sliding basis optimization for two step thrust profile in accordance with embodiments described herein;

DETAILED DESCRIPTION

Figure 1:
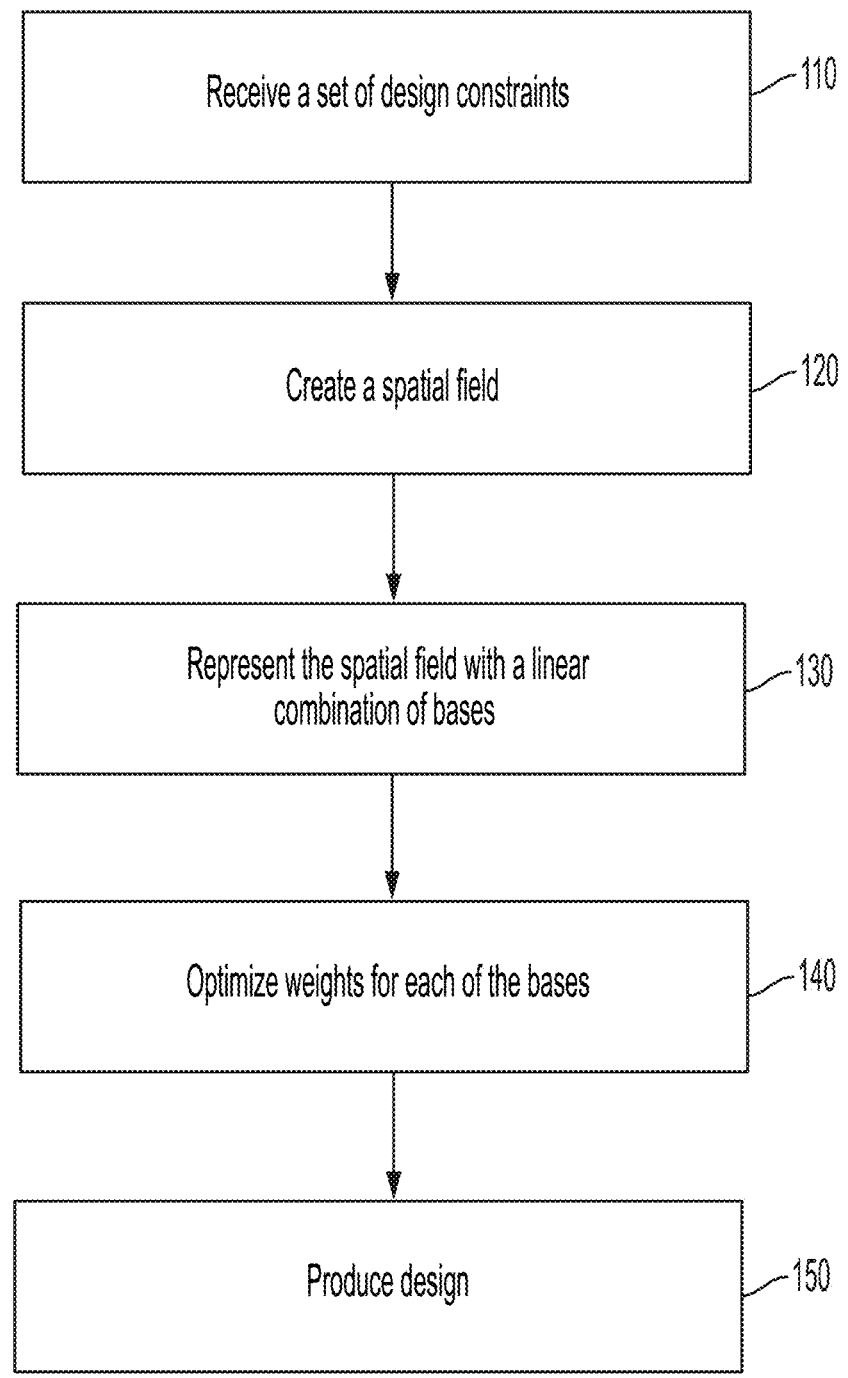
FIG. 1 shows a process for producing a design with reduced parameters in accordance with embodiments described herein.

Design of a spatial field such as material distribution inside a given domain usually requires solving an inverse optimization problem coupled with a physical simulation. Topology optimization is the most prominent example of such spatial field optimization in the form of density distribution. However, most these optimization algorithms rely on the idea that gradients related to simulation variables can be computed analytically. While these analytical gradients and their adjoint variables are well defined for linear elasticity problems where classical Ku=F problem is solved, computation of analytical gradients can be problematic when the analysis is done by an external solver or when the analytical gradients cannot be derived. In such cases, one option is to resort to using numerical gradients. Yet, this approach is impractical since an example spatial field with 100 k elements require additional 100 k additional simulation calls per optimization step even with the simplest first order finite difference approach. Embodiments described herein involve decoupling the design and analysis resolution to reduce the number of optimization parameters through a compact representation of the spatial field.

One example of spatial field optimization coupled with physical analysis is topology optimization where density distribution is optimized using adjoint based gradient computation. Recently, these approaches have been extended to graded material design problems for Young's modulus distribution and density distribution when load uncertainties exist. Embodiments described herein involve tackling the problem where we cannot use efficient analytical gradients to solve optimization problem in practical times. The field may be described as a weighted sum of basis. Black box optimization problems can then be solved with numerical optimization.

Using reduced order parameters such as weighted combination basis has been used in mathematics and engineering. The eigenfunctions of the Laplace equation are one of the most important and commonly used. In geometry processing, eigenvectors of Laplacian have been used analogous to Fourier transform in signal processing. Some examples include uv parameterization, segmentation, deformation field for mesh editing, interactive Young's modulus design. In using Laplacian basis, one unique aspect of embodiments described herein is to use logistic functions to limit the bounds of the spatial field without introducing extra set of constraints to the optimization problem. This enables enforcing the manufacturability constraints in the form of minimum and maximum of the target material property that can be fabricated using the machine in graded material design. This approach can be applied to real life problems where the results can be manufactured rather than just graphical objects. Embodiments described herein may utilize a multi-stage logistic function approach to design discrete multi material distributions (e.g., discrete set of materials) as opposed to smooth graded material distributions (e.g., any material property in a given range). This way, the manufacturability constraints can be enforced in the form of discrete set of materials.

Embodiments described herein tackle the design of spatial fields that are coupled with physical analysis when the analytical gradients of the physical analysis related values with respect to spatial variables are not available. Embodiments described herein show a way to reduce the number of optimization variables without compromising the analysis accuracy by parameterizing material variation as a weighted sum of well-defined basis functions and optimizing for the weights to arrive at an optimal design. According to various embodiments, a Laplacian Beltrami operator is used to represent the high-resolution spatial fields in a compact form.

The manifold harmonics form a complete orthonormal basis so any field over the shape can be described as a weighted combination of the basis functions. Therefore, if we are trying to optimize the material variation in a given shape, the manifold harmonics are an attractive basis because any material field can be projected on to them. In addition, these manifold harmonics are multi-scale spectral mesh representations meaning global features are captured by the bases that correspond to smaller eigenvalues and small-scale features are captures by the bases that correspond to large eigenvalues. This way, we can make sure the most important global properties of the shape will be captured even when using small number of basis.

FIG. 1 shows a process for producing a design with reduced parameters in accordance with embodiments described herein. A set of design constraints are received. These design constraints can include any kind of design requirement. For example, the design constraints can include materials, size, shape, etc. A spatial field is created 120 based on the received design constraints. The spatial field is represented 130 with a linear combination of one or more bases. According to various configurations, the spatial field comprises a linear combination of one or more Laplacian bases.

According to various configurations, a number of the one or more bases is less than a number of elements in the spatial field. For example, the one or more bases may be less than the number of elements in the spatial field by a predetermined factor Respective weights for each of the one or more bases are optimized 140. According to various implementations, the respective weights are optimized using one or both of analytical and numerical gradients. A design is produced 150 based on the spatial field and the weights.

According to embodiments described herein, a logistic function is used to enforce one or both of an upper bound constraint and a lower bound constraint. The logistic function may be used before creating the spatial field. According to various configurations, a multi-stage logistic function approach is used to design discrete multi material distributions.

According to embodiments described herein, a sliding basis optimization is performed and the design is produced based on the sliding basis optimization. In some cases, performing the sliding basis optimization comprises optimizing for a first set of bases, shifting a selected basis by a predetermined amount, and optimizing for a second set of bases. According to various configurations, the sliding basis optimization continues until convergence is achieved. Sliding basis optimization that facilitates efficient exploration of the basis space may be used. Given an input domain represented with a mesh M and a set of input goals, the material field F defined on the domain such that the input goals are satisfied. The key idea of this approach is to parameterize the material field as a weighted sum of well-defined basis functions such that $F=Bw$ where $B \in R^{n_e \times k}$ is basis matrix and $w \in R^k$ is the weight vector. Here, k and $n_e$ correspond to number of selected basis and number of elements in M. By optimizing the weights of the basis functions, reduce the number of optimization variables may be reduced to arrive at an optimal field design. Instead of using a set of predetermined basis functions, we start with the basis functions that correspond to global features and slide on the basis axis towards the basis functions corresponding to local features.

While embodiments described herein may be applied to a rocket propellant design, it is to be understood that these techniques may be applied to any kind of material optimization problem. A main goal of the graded rocket propellant design is to provide an understanding for graded material design of time-varying problems. For rocket propellant design, time-varying problem takes the form of shaping thrust vs time profile that is obtained through burning the graded rocket propellant. In addition to the time-varying nature, this problem introduces another challenge which is eliminating the need for insulation such that all the propellant at the casing burns together in the last time step. Thus, no insulation requirement can be represented as a surface constraint where the case surface and the final burn surface match each other.

Figure 2A:
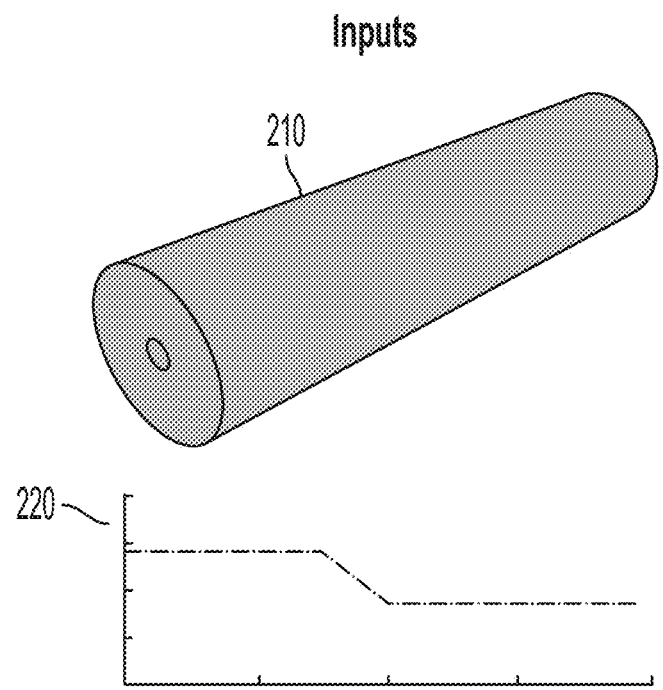
FIGS. 2A-2D show an overview of the approach using a sliding basis optimization for the solid rocket fuel design problem in accordance with embodiments described herein.
Figure 2B:
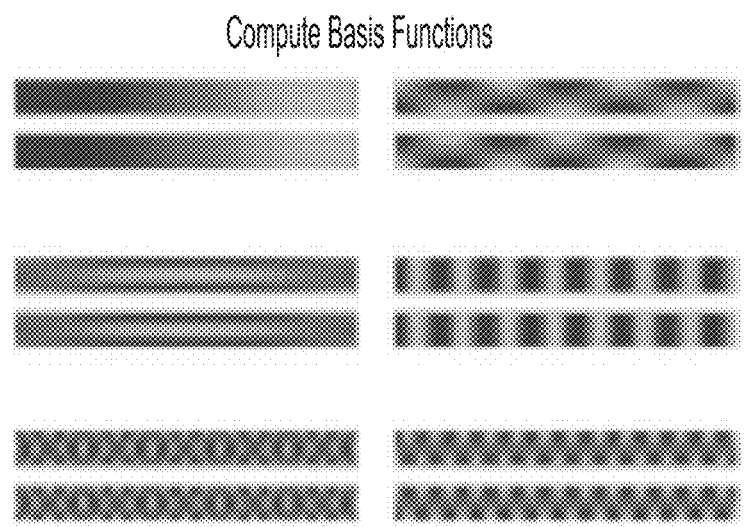

FIGS. 2A-2D show an example material field optimization pipeline in accordance with embodiments described herein. The system has various inputs. FIG. 2A shows the inputs including a mesh domain 210 and one or more target goals 220. In the rocket propellant example shown, the mesh domain may include a rocket case geometry and/or an inner burn surface and the target goals may include a target thrust profile 220, for example. The inputs may be used to initialize the system. Initialization may include generating a background domain, generating signed distance fields, generating material basis functions, and/or generating one or more material distributions. FIG. 2B shows basis functions computed based on the inputs.

Figure 2C:
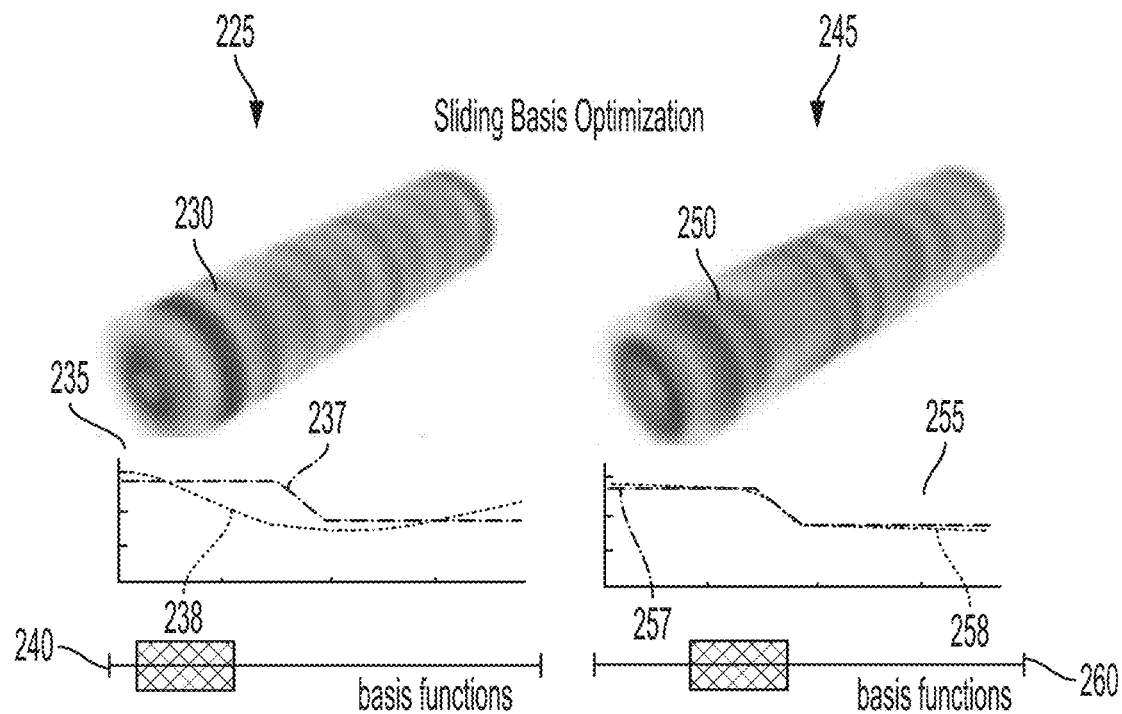
Figure 2D:
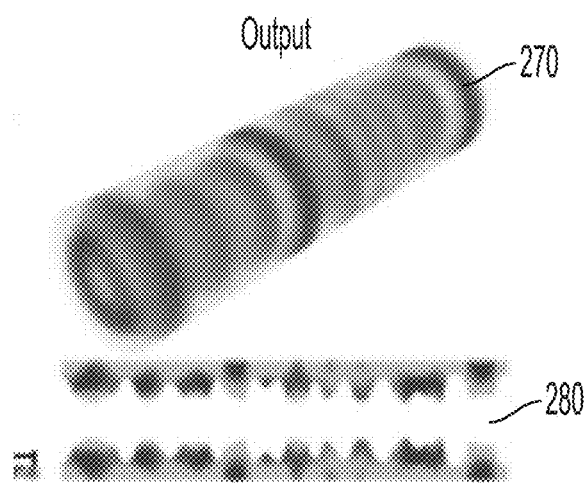

According to various embodiments, the system optimizes for the weights of the basis functions by keeping only a small number of the basis functions active and sliding on the basis functions axis with each consecutive step to find the material distribution that achieves target objectives and constraints. The sliding basis optimization process is shown in FIG. 2C. The sample output 230 for a basis function within the range shown in 240 is shown. As can be observed in the first sliding basis range 225, the output thrust profile 238 is quite different than the input target thrust profile 237. In the second example 245 having basis functions within the range shown in 260, the output is shown 250. As can be observed, the output thrust profile 258 is much closer to the input target thrust profile 257. Two views 270, 280 of an output after performing the sliding basis optimization is shown in FIG. 2D.

For each new design scenario, it is assumed that the design goals can be described through objective and constraints in the form of a general optimization problem in (1).

$$\min_{w} f(w) \quad (1)$$
$$\text{s.t. } g_i(w) \leq 0$$

Here, the optimization problem is coupled with a physical analysis, $\Omega(F)$. Note that this model reduction method is differentiable and if the analytical gradients are already derived for the full material field, $$\frac{\partial f}{\partial F},$$

it is easy to compute the gradients for the reduced order problem through a simple chain rule multiplication as given in (2)

$$\frac{\partial f}{\partial w} = \frac{\partial f}{\partial F} \frac{\partial F}{\partial w} \quad (2)$$

Here, $$\frac{\partial F}{\partial w}$$

is the constant reduced order basis matrix, B.

While designing material distributions, the optimization problem is typically very high dimensional since the number of optimization parameters is equal to the number of elements on the discretized analysis domain, M. Instead, we represent the material distribution with a small number of weights and the precomputed Laplacian basis functions. The combinatorial interpretation of the Laplacian using discrete exterior calculus leads to the well-known Laplace Beltrami operator, in turn leading to the idea of a graph Laplacian, $L \in \mathbb{R}^{n_e \times n_e}$. Graph Laplacian of a spatial field M represented with a vertex list and element connectivity can be computed as $L=D-A$ where D is a diagonal matrix with each entry representing degree of the element and A is the adjacency matrix given by (3).

$$A(i, j) = \begin{cases} 1 & \text{if elements } i \text{ and } j \text{ share a vertex,} \\ 0 & \text{otherwise} \end{cases} \quad (3)$$

Depending on the structure of the mesh and the specific problem, different variants of graph Laplacian can be used. For example, area weighted or cotangent weighted Laplacian formulation is beneficial when the domain is discretized by non-uniform triangulation. The Laplacian bases for any mesh can be derived by solving for the eigenvectors of L as shown in (4).

$$\lambda_i e_i = L e_i, \forall i \quad (4)$$

Here, $\lambda_i$ and $e_i$ are the eigenvalues and eigenvectors of L, respectively. The B matrix can be assembled by concatenating the eigenvectors side by side, $B=[e_1, e_2, \ldots, e_k] \in \mathbb{R}^{n_e \times k}$. Using weights of the basis functions $w=[w_1, w_2, \ldots, w_k]^T$ as design variables, the material field can be represented as $F=Bw$. During sliding basis optimization, additional basis functions are introduced as needed by simply assembling the new basis vectors to the right side of B. To compute the basis functions, an eigen decomposition operation is performed. Full eigen decomposition of a large matrix is a costly operation. Yet, we are interested in only a small subset of the eigenvectors and there are efficient approaches to compute a subset of eigenvectors.

Figure 3:
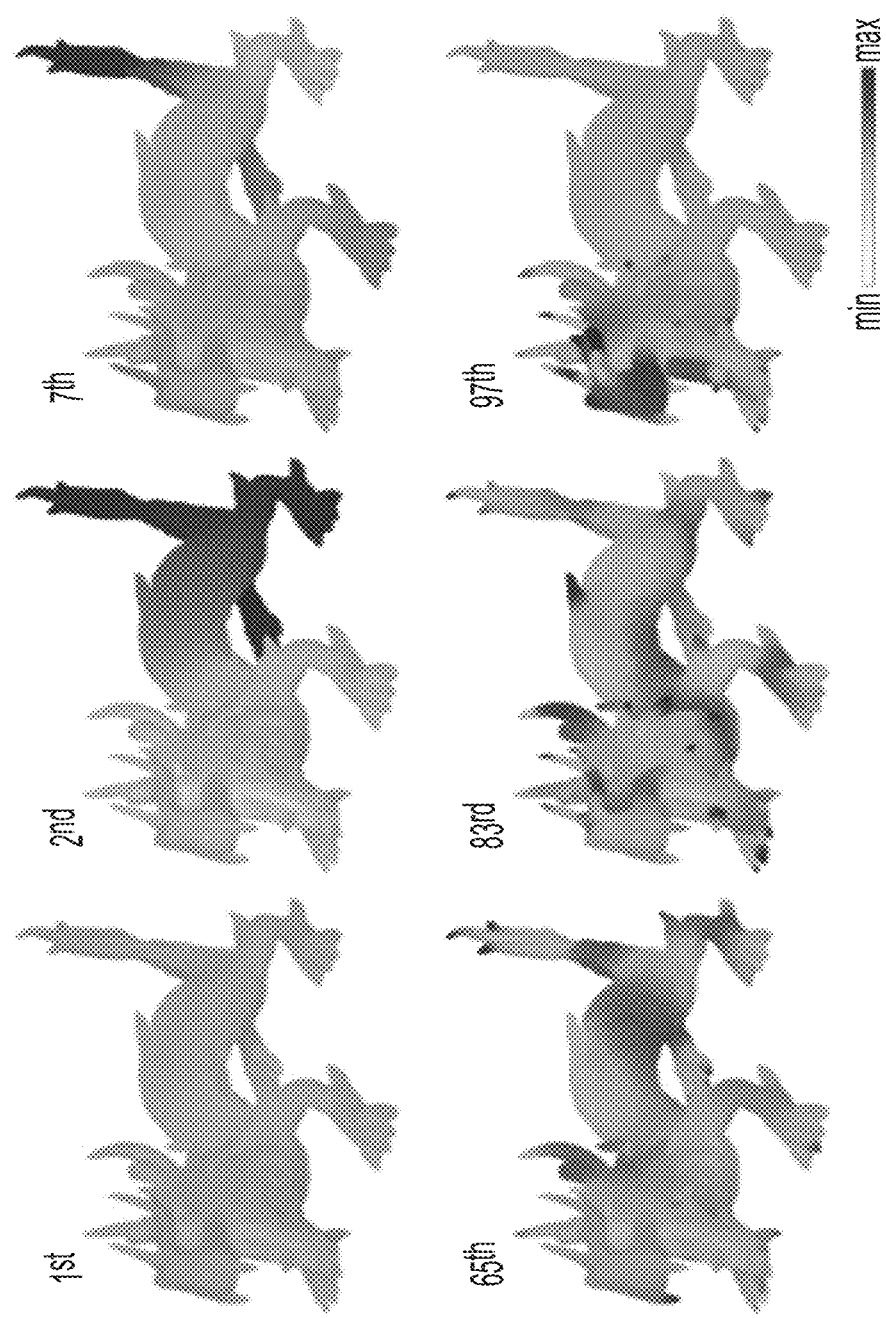
FIG. 3 shows the spectral properties of Laplacian basis on an arbitrarily selected set in accordance with embodiments described herein.

Laplacian basis functions provide very important features that make them very suitable for our optimization applications. They are complete orthonormal and smooth allowing any field to be represented as a weighted combination and facilitating well-defined continuous optimization. They also capture topology and geometry of the shapes such as intrinsic symmetry. One feature that is used is the spectral property of the Laplacian basis where the level of detail in the spatial field increases with the higher frequency basis functions as shown in FIG. 3). This property naturally lends itself to our sliding basis optimization and allows the design space exploration starting from global features to local details. FIG. 3 shows the spectral properties of Laplacian basis on an arbitrarily selected set. Notice the basis functions initially represent lower frequency global features and higher frequency local details later on.

Figure 4:
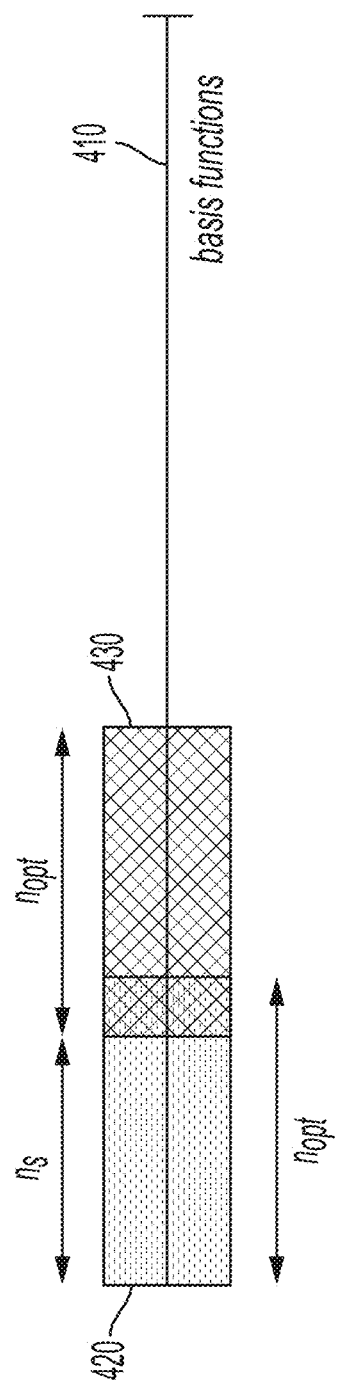
FIG. 4 illustrates the basic idea of sliding basis optimization in accordance with embodiments described herein.

FIG. 4 illustrates the basic idea of sliding basis optimization where $n_{opt}$, $n_s$ are the number of optimization variables and amount of sliding at each sliding basis optimization step, respectively. The basis space is explored through multiple optimization operations where weights corresponding to the chosen $n_{opt}$ bases are optimized. First, we optimize for only a small number of basis 420, $n_{opt}$ and we slide on the basis axis 410 by $n_s$ and perform another optimization 430 with $n_{opt}$ variables until convergence. Algorithm 1 describes the approach in detail.

---

Algorithm 1: Sliding basis optimization

---

Input: $n_{opt}$, $n_s$, $s_{max}$
Output: Optimized basis weights, w
$i_{sb} \leftarrow 0$
$it_s \leftarrow 0$
$f \leftarrow \Psi$
$w \leftarrow \emptyset$
while not converged or $it_s < s_{max}$ do
    $w_s \leftarrow$ Initialize( )
    $(w_s, f_s) \leftarrow$ Optimize($i_{sb}$, $n_{opt}$)
    if $f - f_s \geq \epsilon$ then
        $w \leftarrow [w[0:i_{sb}], w_s]$
        $f \leftarrow f_s$
        $it_s \leftarrow 0$
    else
        $w \leftarrow [w, 0]$
        $it_s \leftarrow it_s + 1$
    end
    $i_{sb} \leftarrow i_{sb} + n_s$
end Given $n_{opt}$, and $s_{max}$ is number of maximum trials before stopping if there is no significant improvement in objective value, the algorithm returns optimum basis weights, w. First, sliding basis index, $i_{sb}$, and sliding iteration, its, are initialized to be zero and the objective value f is set to a large number, $\psi$. Inside the while loop, we start by initializing the weights for the basis that will be optimized, $i_{sb}$ to $i_{sb}+n_{opt}$. Then, we call the optimizer that outputs the optimized weight for the target bases, $w_s$, and the optimized objective value, fs. Note that the optimize step can be implemented using commodity optimizers which can be gradient based or stochastic sampling based. In our examples, we used sequential quadratic programming (SQP) since it is a very effective state of the art nonlinear programming method for general optimization problems. After the optimize step, the optimized weights are accepted or rejected depending on the objective value and the basis functions are slided by updating $i_{sb}$. The sliding basis optimization stops if the addition of the additional basis does not significantly improve the objective or another predefined convergence criteria is satisfied.

Several strategies may be used for initialization of optimization of variables at each consecutive sliding basis step in accordance with embodiments described herein, three strategies for initialization are described here: (1) Previous optimum, (2) All zero, and (3) Random. Initializing the weights with the previous optimum corresponds to assigning 0 value for each new added basis and using the optimized values for the weights of the overlapping basis functions that will be re-optimized in the current step. With this approach, it was found that the initial conditions may correspond to a local minimum and the new optimization may not improve the objective. This approach may lead to getting stuck at the local minima in the consecutive sliding basis steps. In contrast, approaches (2) and (3) moves the initial condition to another place in the basis domain. These initialization approaches act as a local perturbations and alleviate the local minima issues of general nonlinear optimization problems.

For graded material design problems, bounds of the allowable material properties may need to be enforced so that the optimized field can be manufactured. To enforce the bounds, one approach is to add additional linear inequality constraints in the form of $B_w \leq u_{mb}$ and $B_w \geq l_{mb}$ to the general optimization problem given in (1). However, this increases the number of constraint by 2*ne which could be in the order of hundred thousands for dense material distributions. This increase in the number of constraints slows down the optimization process significantly. Instead, we use a filtering approach to bound the material distribution of the field without introducing additional constraints.

Logistic function is used as shown in (5).

$$l(x) = l_{mb} + \frac{u_{mb} - l_{mb}}{1 + \exp(-\kappa(x))} \quad (5)$$

Figure 5A:
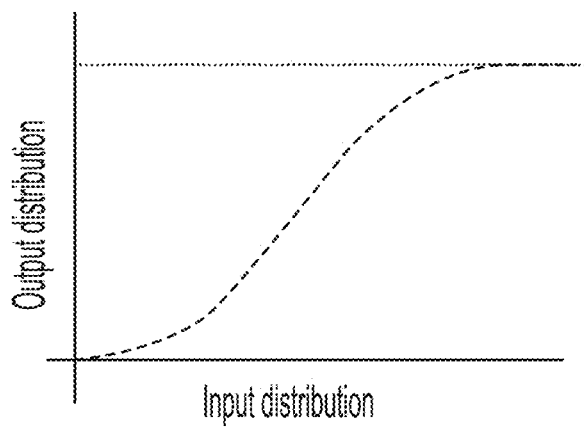
FIGS. 5A and 5B show using logistic functions in the optimization process in accordance with embodiments described herein.
Figure 5B:
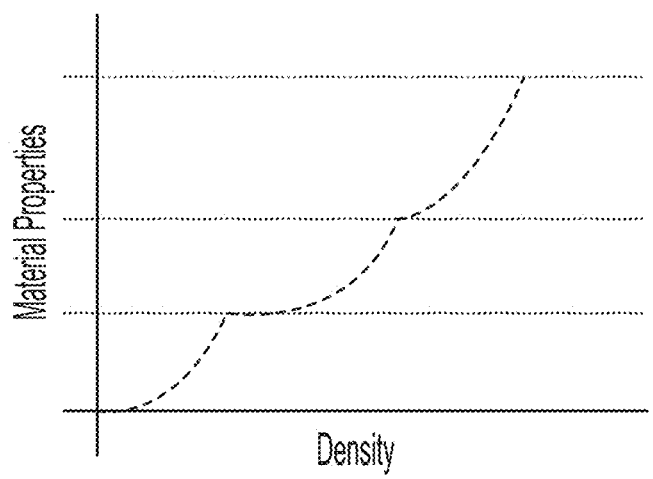

Here, $\kappa$ is the steepness parameter set to give a gentle slope as shown in FIG. 5A. After the material field is computed as a weighted combination of the basis functions, the logistic function is utilized to enforce the bounds of the manufacturing technique. This approach provides a differentiable way to limit the material properties for manufacturability. Similarly, the material constraints for multi-material optimization of discrete sets are enforced by combining this filtering approach with the penalization methods. Initially, the filtering approach can be used to bound the density field between 0 and 1. The materials can then be pushed into discrete set values as shown in FIG. 5B.

Assume that total number of Laplacian basis functions are selected to be n and a gradient based optimization approach such as SQP is utilized to solve an arbitrary graded material design problem. The costliest step in such an approach is often the Hessian computation where the computational cost increases quadratically with the increasing number of design variables (i.e., number of basis functions in our case), $O(n^2)$. For cases involving black-box analysis components, conventional way of solving the problem (i.e., optimizing all n design variables at once) results in $n^2$ analysis runs in each optimization step to construct the Hessian matrix. Given that analysis operations are often expensive, quadratic relationship prohibits the use of large n by creating computational bottlenecks. In the sliding basis optimization approach, on the other hand, total computational cost is kept lower by exploring same n basis functions gradually, $n_{opt}$ at a time. In this case, only $n_{opt}^2$ analysis runs are required to construct the Hessian matrix. Here, it is important to note that $n_{opt} \ll n$. As the optimizer needs to be reinitialized after each slide in our approach, $p=(n-n_{opt})/n_s+1$ complete optimization operations are performed to cover n basis functions. Assuming same number of iterations are performed in each optimization operation and $n_s \rightarrow n_{opt}$, this translates to reducing the total computational cost by a factor of up to $n_{opt}/n$ over optimizing for fixed n basis.

Here, two applications are described: the graded solid rocket fuel design and multimaterial topology optimization. A main goal of the rocket fuel design application is to develop a computational design tool for design of a solid rocket propellant (both the geometry and graded burn rate distribution). The propellant should satisfy two main requirements: (1) substantially matching the target thrust-time profile when it burns and/or (2) no insulation is required such that the moment prior to burn out all the case surface covered with some material that vanishes at the same time. This way, all of the propellant at the casing surface burns at the same time and does not expose any part of the case surface to ongoing burning. Here, the insulation is not needed and because of this the weight is reduced significantly. Then time-varying nature of this problem brings up extra computational complexity. This model reduction and efficient sliding basis exploration plays a role for the solution of such problems.

For the optimization of the rocket propellant example, the $l^2$ norm of the error is minimized in thrust profile match while constraining the inner burn surface for no insulation requirement as shown in (6).

$$\min_w \sum_t (th(w) - th_{target})^2 \quad (6)$$

$$\text{s.t. } r_b(w)^i > r_{in}$$

Here, $th_{target}$ and th represent the target thrust profile and the current thrust profile achieved with the distribution F computed using the weights w. Since the physical analysis solves a boundary value problem and constructs the level set of the burn surfaces starting from the outer case, we are able to optimize the material distribution and the initial burn surface comes as the byproduct. For each material distribution, represent the inner burn surface is represented through a set of radius values, $r_b^i$, and check if they are all inside the allowable inner surface region defined by the radius value, $r_{in}$.

The sliding basis optimization results for four different thrust profiles as constant acceleration 610, constant deceleration 620, two step 630, and bucket 640 are shown in FIG. 6. Since the physical analysis assumes axially symmetric material distributions, the cross section is parameterized and the basis functions are computed on the cross section.

Figure 7:
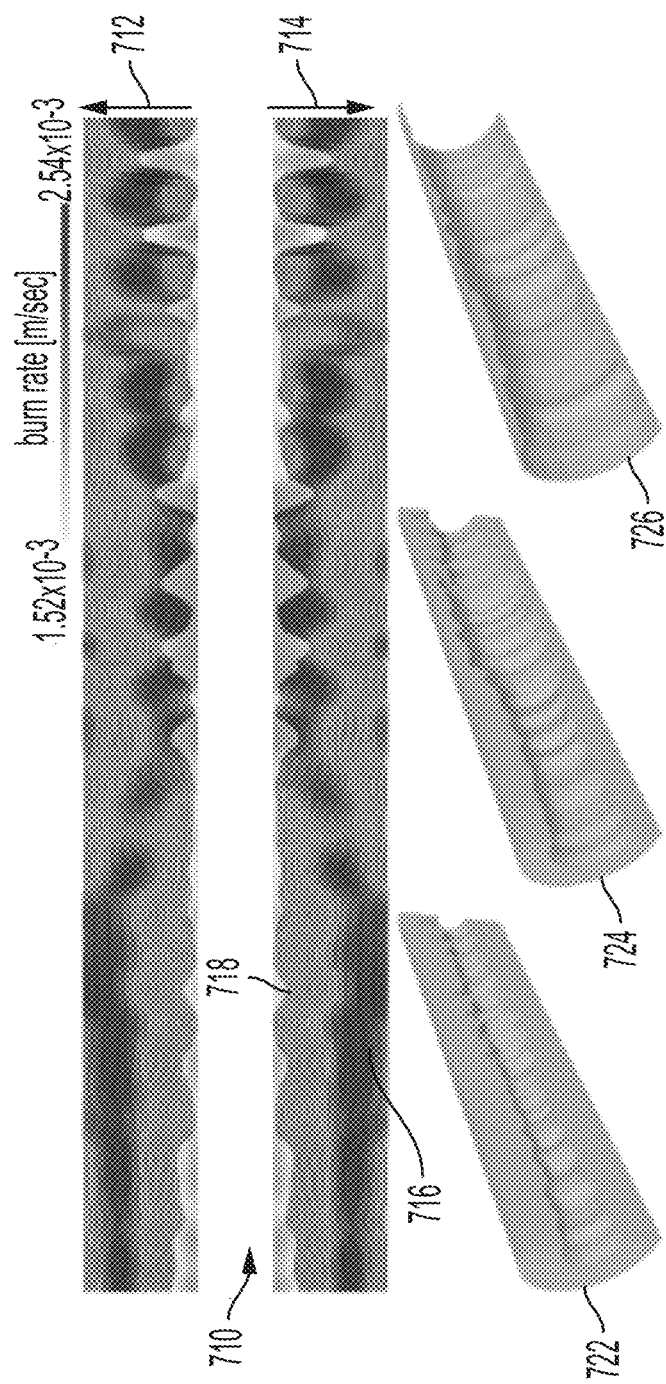
FIG. 7 shows the burn front lines on the cross section of solid rocket with the graded burn rate distribution for the constant acceleration thrust profile in accordance with embodiments described herein.

FIG. 7 shows the burn front lines 710 on the cross section of solid rocket with the graded burn rate distribution for the constant acceleration thrust profile. Arrows 712, 714 denote the burn direction. As can be observed, the lines spread apart in the high burn rate material regions 716 compared to the low burn rate regions 718. The cutouts 722, 724, 726 illustrate the solid rocket fuel at three stages of the burn propagation. As shown in FIG. 7, the burn rate distribution on the whole rectangular cross section is parameterized. For the examples discussed here, 3000 quad elements were used on the cross section. Due to the boundary value problem formulation which takes the last burn front (outer cylindrical surface) as input, the inner burn surface is computed as a byproduct of the simulation. After the optimization is completed, the portions of the cross section that are beyond the inner surface are masked since these portions are not needed to achieve the desired target thrust profile behavior.

For the multimaterial topology optimization application, the sliding basis optimization approach is applied with given discrete set of predefined materials for structural mechanics problems. Assuming linear isotropic materials and small deformations, we solve the linear elasticity problem Ku=F where K, u and F are the stiffness matrix, nodal displacement vector, and nodal external force vector, respectively. In this implementation, the domain is discretized using tetrahedral elements characterized by linear shape functions assuming static load and fixed displacement boundary conditions. The multimaterial design optimization is formulated as a density based topology optimization problem with compliance minimization and mass fraction constraint as shown in (7).

$$\min_{w} \; u^T K u \quad (7)$$
$$\text{s.t.} \;\; m/m_0 \le m_{frac}$$
$$Ku = F$$

Here, m, $m_0$ and $m_{frac}$ are mass of the current design, mass of the design domain fully filled with maximum density and prescribed mass fraction. Here, $u^T K u$ represents the compliance of the structure. The ordered multi-material SIMP interpolation approach is adopted since it does not introduce additional variables and computational complexity as the number of materials increase. The interpolation step is incorporated after computing the density field with the weights and basis functions and using the bounding filter to keep density values in [0, 1] limits.

Table 1 summarizes the number of optimization problems ($n_{opt}$), sliding amount ($n_s$), number of sliding steps ($n_{slides}$), and the total number of basis functions that is explored through sliding steps. For constant acceleration, two step and bucket profiles, 20 optimization variables and sliding amount of 15 were used. For constant deceleration, 50 optimization variables were used and it was observed that using more optimization variables gives better performance for this problem. The main reason for this difference is that constant deceleration is a more challenging thrust profile and it requires more complex material distributions. Thrust is proportional to the surface area of the burn front at a given time. Since the surface area naturally increases as the burn surface propagates from inside to the outside of the cylinder, creating high thrust at beginning and very low thrusts at the end requires complex material distributions that can create higher surface areas initially. Thus, this more challenging problem may require more basis to match the target thrust profile. Note that, although we use more optimization variables in sliding basis optimization, the optimization is still sped up about 8 times compared to fixed basis optimization since convergence requires more basis in total.

TABLE 1

| Thrust Profile | $n_{opt}$ | $n_s$ | $n_{slides}$ | Total Basis | Fixed Basis | | Sliding Basis | |
| --- | --- | --- | --- | --- | --- | --- | --- | --- |
| | | | | | Time | Objective/Error | Time | Objective/Error |
| Constant Acceleration | 20 | 15 | 14 | 230 | 1178 s | 349k/2.3% | 288 s | 86k/1.1% |
| Constant Deceleration | 50 | 40 | 7 | 320 | 4896 s | 867k/3.4% | 621 s | 452k/2.7% |
| Two Step | 20 | 15 | 7 | 125 | 191 s | 102k/1.1% | 69 s | 217k/1.4% |
| Bucket | 20 | 15 | 24 | 380 | 1006 s | 272k/1.8% | 596 s | 272k/1.8% |

FIG. 8A shows the target and optimized thrust profile results during six steps of sliding basis optimization for two step thrust profile. The first optimization step 810 result 814 that uses only twenty basis functions does not match the target profile 812 well since the small number of basis functions is not enough to create complex enough material distributions. In the consecutive steps, however, the resulting thrust profiles progressively match the target better as more basis functions are incorporated with each sliding. The second step 820 result 824 still does not match the target profile 822, but is closer than that of the first step 820. The result 834 for the third step 820 matches the target profile 832 much better than step 1 810 or step 2 820. The result 844 for step 4 840 is even closer to the target profile 842 than any of step 1, 810, step 2 820, or step 3 830. The result 854 for step 5 850 is even closer to the target profile 852 than any of step 1, 810, step 2 820, step 3 830, or step 4 840. The result 864 for step 6 860 is even closer to the target profile 862 than any of step 1, 810, step 2 820, step 3 830, step 4 840, or step 5 850. Finally, the sliding optimization stops when the convergence criteria is satisfied. For this application, we used 5% error in the profile match as the convergence criteria.

Figure 9A:
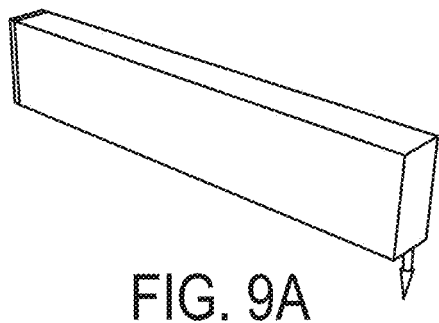
FIGS. 9A-9F presents the optimized material distributions for a cantilever beam and the bracket examples in accordance with embodiments described herein.
Figure 9B:
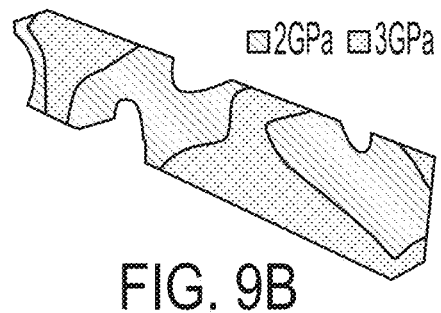
Figure 9C:
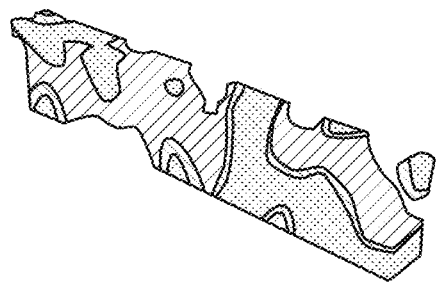
Figure 9D:
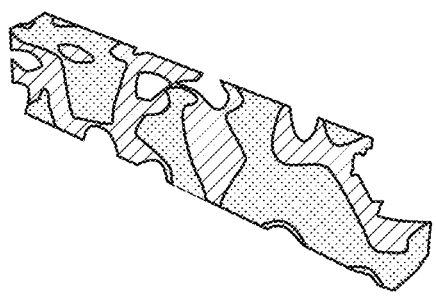

FIGS. 9A-9F presents the optimized material distributions for a cantilever beam and the bracket examples in accordance with embodiments described herein. FIG. 9A shows the problem setup for the optimized material distribution for the cantilever beam. FIGS. 9B-9D illustrate three steps of the sliding basis optimization for the cantilever beam. For the beam example shown in FIGS. 9A-9D, a discrete set of void and two materials with normalized density values of 0, 0.1 and 1 and Young's modulus values of 0, 2 GPa and 3 GPa are used. From FIG. 9B-FIG. 9D the number of optimized basis functions increase from 20 to 170 indicating the complexity of material distribution increases as the number of basis functions increases. This sliding basis optimization is performed using $n_{opt}$=20 and $n_s$=15 with mass fraction constraint, $m_{frac}$ of 0.5 on a mesh with 19567 tetrahedral elements. Using numerical gradients (i.e., treating simulation as black-box), it is observed that sliding basis optimization results in approximately 3 times faster computation time (87 mins vs 259 mins) compared to fixed basis optimization with 170 basis.

Figure 9E:
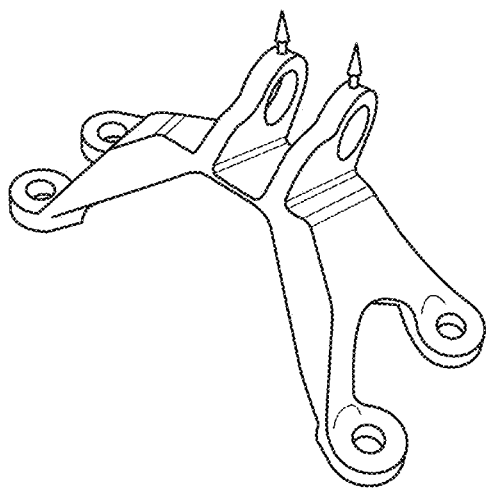
Figure 9F:
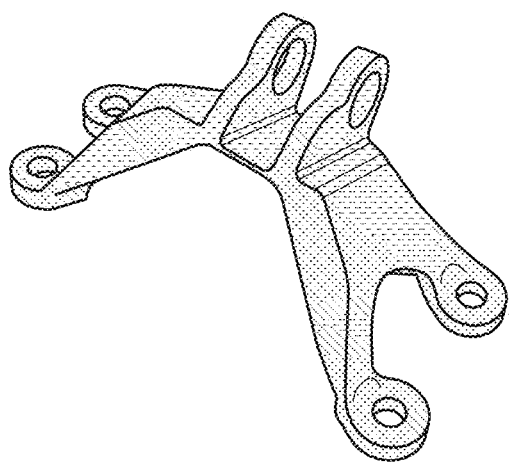

The optimized material distribution of the bracket model is given in FIGS. 9E and 9F for a discrete set with three materials (normalized densities: 0.1, 0.3, 1 and Young's modulus: 1.5 GPa, 2.5 GPa, 3 GPa). It can be observed that the optimizer places the strongest material on the load paths and around the high stress regions such as where the boundary conditions and forces are applied. The optimization is performed using $n_{opt}$=20 and $n_s$=15 with mass fraction constraint, $m_{frac}$ of 0.5 on a mesh with 174454 tetrahedral elements. For this particular example, instead of using the numerical gradients, we derived and utilized the analytical gradients. The analytical gradient computation is an extremely fast operation for compliance minimization. Thus, the only costly operation during the optimization is the linear solve while finding the Lagrange multipliers. However, the computational cost of a linear solve operation with a matrix of size 20 or 200 are marginally different for state-of-the-art linear solvers. Therefore, we do not observe a computational gain for using the sliding basis optimization over the fixed basis optimization for this particular compliance minimization problem when analytical gradients are utilized. However, note that fixed basis optimization already reduces the computational cost of the linear solve from a matrix of size 174454 to a matrix of 200. Furthermore, sliding basis optimization could provide more significant computational gain over fixed basis for problems with costly analytical gradient computations.

Figure 10:
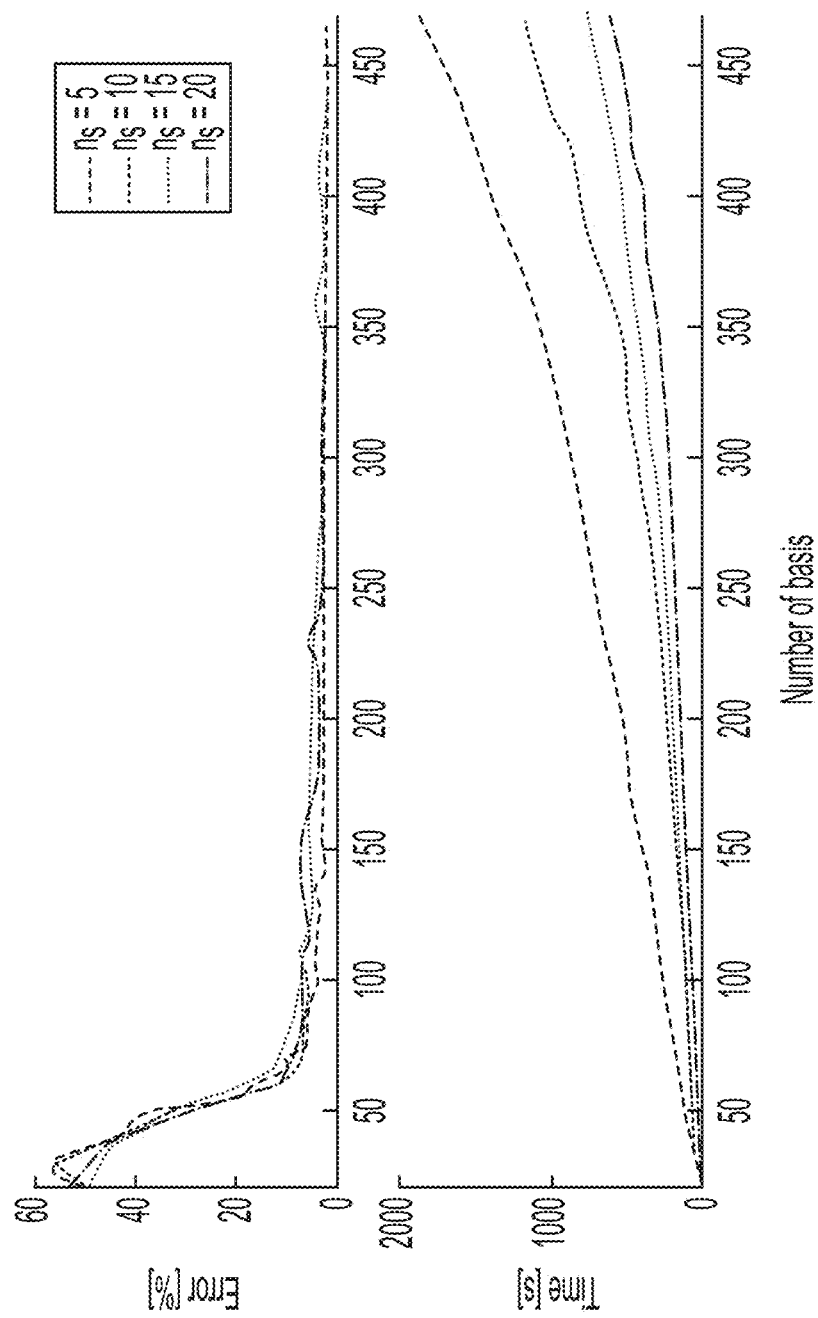
FIG. 10 shows the effect of sliding amount in accordance with embodiments described herein.

FIG. 10 shows the percentage error and time with respect to number of explored basis functions for different sliding amount values, $n_s$. In terms of selecting the sliding amount, we found that lowering the sliding amount and re-optimizing for more basis functions might give better objective reduction capabilities for lower number of explored basis functions. However, as the number of explored basis increases, ns values converge to similar objective values. Additionally, small sliding amounts take more computational time to cover the same amount of basis functions since more basis functions are re-optimized due to the overlap. In summary, we found that using large sliding amounts (ns nopt) with small overlap works well resulting in similar objective minimization performance compared to small sliding amounts with minor increase in computational time. In our examples, we observed that ns is about $0.75*n_{opt}$ gives a good tradeoff between objective minimization and computational performance.

Figure 11:
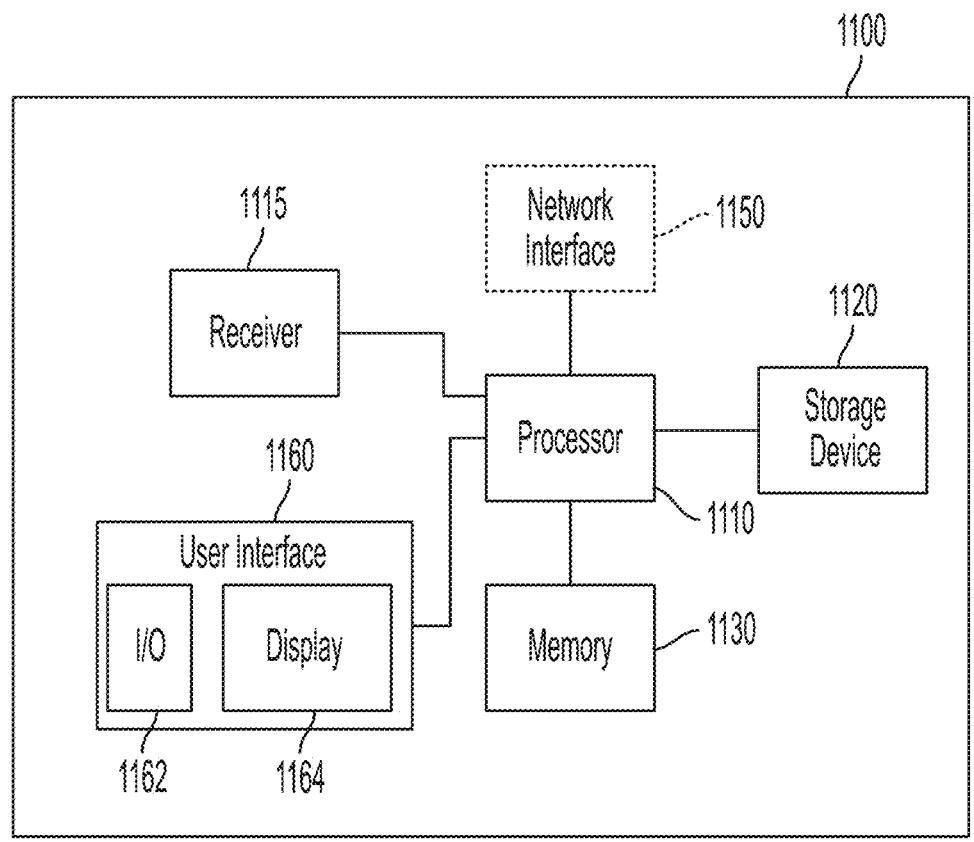
FIG. 11 illustrates an example computer system that can implement the methods described herein; and The figures are not necessarily to scale. Like numbers used in the figures refer to like components. However, it will be understood that the use of a number to refer to a component in a given figure is not intended to limit the component in another figure labeled with the same number.

The above-described methods can be implemented on a computer using well-known computer processors, memory units, storage devices, computer software, and other components. A high-level block diagram of such a computer is illustrated in FIG. 11. Computer 1100 contains a processor 1110, which controls the overall operation of the computer 1100 by executing computer program instructions which define such operation. It is to be understood that the processor 1110 can include any type of device capable of executing instructions. For example, the processor 1110 may include one or more of a central processing unit (CPU), a graphical processing unit (GPU), a field-programmable gate array (FPGA), and an application-specific integrated circuit (ASIC). The computer program instructions may be stored in a storage device 1120 (e.g., magnetic disk) and loaded into memory 1130 when execution of the computer program instructions is desired. Thus, the steps of the methods described herein may be defined by the computer program instructions stored in the memory 1130 and controlled by the processor 1110 executing the computer program instructions. The computer 1100 may include one or more network interfaces 1150 for communicating with other devices via a network. The computer 1100 also includes a user interface 1160 that enables user interaction with the computer 1100. The user interface 1160 may include I/O devices 1162 (e.g., keyboard, mouse, speakers, buttons, etc.) to allow the user to interact with the computer. The user interface also includes a display 1164. According to various embodiments, FIG. 11 is a high-level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate embodiments described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method for producing a design, comprising:
   receiving a set of design constraints;
   creating a spatial field based on the set of design constraints;
   representing the spatial field with a linear combination of a first set of bases, a number of the first set of bases being less than a number of elements in the spatial field;
   performing a sliding basis optimization to determine optimized basis weights and a final set of bases, the sliding basis optimization comprising:
   optimizing respective first weights for each of the first set of bases;
   shifting a selected basis of the first set of bases by a predetermined amount to determine a second set of bases that represents the spatial field at an increased level of detail; and
   optimizing respective second weights for each of the second set of bases; and producing the design based on the final set of bases and the optimized basis weights.

2. The method of claim 1, wherein the first and second sets of bases comprise Laplacian bases, and wherein the second set of bases have a higher frequency than the first set of bases.

3. The method of claim 1, wherein the number of the first set of bases is less than the number of elements in the spatial field by a predetermined factor.

4. The method of claim 1, further comprising using a logistic function to enforce one or both of an upper bound constraint and a lower bound constraint.

5. The method of claim 4, wherein using the logistic function comprises using the logistic function before creating the spatial field.

6. The method of claim 1 further comprising using a multi-stage logistic function approach to design discrete multi material distributions.

7. The method of claim 1, wherein optimizing the first and second weights comprises using one or both of analytical and numerical gradients.

8. The method of claim 1, wherein the sliding basis optimization continues for additional bases beyond the second set of bases until convergence is achieved.

9. A system for producing a design, comprising:
a processor; and
a memory storing computer program instructions which when executed by the processor cause the processor to perform operations comprising:
receiving a set of design constraints;
creating a spatial field based on the set of design constraints;
representing the spatial field with a linear combination of a first set of bases, a number of the first set of bases being less than a number of elements in the spatial field;
performing a sliding basis optimization to determine optimized basis weights and a final set of bases, the sliding basis optimization comprising:
optimizing first weights for each of the first set of bases;
shifting a selected basis of the first set of bases by a predetermined amount to determine a second set of bases that represents the spatial field at an increased level of detail; and
optimizing respective second weights for each of the second set of bases; and
producing the design based on the final set of bases and the optimized basis weights.

10. The system of claim 9, wherein the first and second sets of bases comprise Laplacian bases, and wherein the second set of bases have a higher frequency than the first set of bases.

11. The system of claim 9, wherein the processor is further configured to use a logistic function to enforce one or both of an upper bound constraint and a lower bound constraint.

12. The system of claim 11, wherein using the logistic function comprises using the logistic function before creating the spatial field.

13. The system of claim 9 further comprising using a multi-stage logistic function approach to design discrete multi material distributions.

14. The system of claim 9, wherein optimizing the first and second weights comprises using one or both of analytical and numerical gradients.

15. The system of claim 9, wherein the sliding basis optimization continues until convergence is achieved.

16. A non-transitory computer readable medium storing computer program instructions, the computer program instructions when executed by a processor cause the processor to perform the method of claim 1.

* * * * *